(12) United States Patent
Anderson (10) Patent No.: US 11,293,742 B2
(45) Date of Patent: Apr. 5, 2022

(54) APPARATUS AND METHOD FOR CALIBRATING A GAP SENSOR OF A MACHINE TOOL

(71) Applicant: Honda Motor Co., Ltd., Tokyo (JP)

(72) Inventor: Rocklyn D. Anderson, Sidney, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 98 days.

(21) Appl. No.: 16/844,415

(22) Filed: Apr. 9, 2020

(65) Prior Publication Data
US 2021/0318110 A1 Oct. 14, 2021

(51) Int. Cl.
| | |
|---|---|
| *G01B 5/14* | (2006.01) |
| *G01B 5/00* | (2006.01) |
| *B23Q 17/22* | (2006.01) |

(52) U.S. Cl.
CPC ........... *G01B 5/14* (2013.01); *B23Q 17/2291* (2013.01); *G01B 5/0004* (2013.01); *B23Q 2717/00* (2013.01)

(58) Field of Classification Search
CPC .... G01B 5/14; G01B 5/0004; B23Q 17/2291; B23Q 2717/00
USPC ........................................................... 33/502
See application file for complete search history.

(56) References Cited

U.S. PATENT DOCUMENTS

| | | | | |
|---|---|---|---|---|
| 2,536,401 | A * | 1/1951 | Victor | G01B 3/30 33/567 |
| 3,201,873 | A | 8/1965 | Bell et al. | |
| 3,908,278 | A * | 9/1975 | Sundahl | G01B 3/30 33/502 |
| 4,081,910 | A | 4/1978 | Hammond | |
| 5,125,261 | A * | 6/1992 | Powley | G01B 21/042 33/502 |
| 5,313,410 | A * | 5/1994 | Watts | G01B 21/042 33/503 |
| 6,226,884 | B1 * | 5/2001 | McMurtry | B23Q 1/5462 33/557 |
| 6,918,188 | B2 * | 7/2005 | McMurtry | B23Q 1/5462 33/558.2 |
| 7,536,798 | B2 * | 5/2009 | Silberberg | G01C 9/28 33/379 |
| 7,908,756 | B2 * | 3/2011 | Clifford | G01B 21/042 33/502 |
| 10,801,824 | B1 * | 10/2020 | Haines | G01G 23/01 |
| 11,040,425 | B2 * | 6/2021 | Lause | G01B 21/042 |

(Continued)

FOREIGN PATENT DOCUMENTS

| | | |
|---|---|---|
| CN | 204788230 U | 11/2015 |
| DE | 3931764 A1 | 4/1991 |

*Primary Examiner* — Yaritza Guadalupe-McCall
(74) *Attorney, Agent, or Firm* — Kenealy Vaidya LLP (57) ABSTRACT

An apparatus for calibrating an air gap sensor of a machine tool can include a gauge block and a plurality of magnets. The gauge block can have a plurality of gauge grooves. Each of the gauge grooves can have a unique gauge depth that corresponds to a respective one of a plurality of predetermined calibration values for the air gap sensor. Each of the magnets can be embedded in the gauge block. A method of using the apparatus for calibrating an air gap sensor can include attaching the apparatus to a machine tool using only magnetic force to keep the apparatus in place.

18 Claims, 5 Drawing Sheets

(56) References Cited

U.S. PATENT DOCUMENTS

2009/0094847 A1* 4/2009 Clifford ............... G01B 21/042
                                                            33/502
2011/0162434 A1   7/2011 Rastogi
2012/0151785 A1* 6/2012 Lettkeman ............ G01C 9/24
                                                            33/301
2019/0358762 A1* 11/2019 Lause ................ B23Q 17/2233

* cited by examiner

APPARATUS AND METHOD FOR CALIBRATING A GAP SENSOR OF A MACHINE TOOL

BACKGROUND

The disclosed subject matter relates to an apparatus and method for calibrating a gap sensor of a machine tool.

A machine tool can be used to machine a desired part from a workpiece. The machine tool can be a lathe, a drill press, or any other appropriate milling, cutting or material removal machine. The machine tool can be automated and controlled by a programmable computer or controller, and can be referred to as computer numerically controlled ("CNC") machine tool. The automated machine tool can include one or more position sensors that can detect the position of the workpiece with respect to a rest pad surface or other appropriate location on the automated machine tool.

SUMMARY

Some embodiments are directed to an apparatus for calibrating a gap sensor of a machine tool and can include a gauge block and a plurality of magnets. The gauge block can have a plurality of gauge grooves. Each of the gauge grooves can have a unique gauge depth that corresponds to a respective one of a plurality of predetermined calibration values for the air gap sensor. Each of the magnets can be embedded in the gauge block.

Some embodiments are directed to a method of calibrating an air gap sensor for a machine tool. The method can include: providing a magnetized calibration device that includes a first surface, a first groove recessed from the first surface, a second surface, and a second groove recessed from the second surface, the first groove having a first predetermined gauge depth and the second groove having a second predetermined gauge depth, where the first predetermined gauge depth is different from the second predetermined gauge depth; selecting one of the first groove and the second groove that corresponds to a desired calibration value for the air gap sensor; attaching the magnetized calibration device to a rest pad of the machine tool using a magnetic attraction of the magnetized calibration device to the rest pad such that the one of the first groove and second groove that is selected faces toward the rest pad and is spaced away from the rest pad by a gap that corresponds to a respective one of the first predetermined gauge depth and second predetermined gauge depth; applying air to the rest pad and the one of the first groove and second groove; using the air gap sensor to obtain a measured value of the gap; and adjusting the air gap sensor when the measured value is not equal to the respective one of the first predetermined gauge depth and second predetermined gauge depth until the measured value is equal to the respective one of the first predetermined gauge depth and second predetermined gauge depth.

Some embodiments are directed to a method of calibrating a gap sensor for a machine tool. The method can include: providing a magnetized calibration block that includes at least a first planar contact surface and a first planar measuring surface, the first planar contact surface being offset from the first planar measuring surface by a first predetermined distance along a first measuring axis of the calibration device, the first measuring axis being perpendicular to the first planar contact surface and first planar measuring surface, the calibration device further including at least a second planar contact surface and a second planar measuring surface, the secondary setting planar surface being offset from the second planar measuring surface by a second predetermined distance along a second measuring axis of the calibration device, the second measuring axis being perpendicular to the second planar contact surface and the second planar measuring surface; setting the magnetized calibration block onto a surface of the machine tool such that one of the first planar measuring surface and the second planar measuring surface is located directly over the gap sensor, and such that at least one of the first planar contact surface and the second planar contact surface is in contact with the surface of the machine tool, and such that the magnetized calibration block is secured to the surface of the machine tool by a magnetic force; and using the gap sensor to obtain a measured distance value of a gap bounded at one side by the one of the first planar measuring surface and the second planar measuring surface.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Position sensors are generally used in a machine tool in order to ensure a workpiece is in a correct position prior to or during execution of a procedure on the workpiece. Each position sensor of the automated machine tool can be subjected to a calibration procedure to confirm that the sensor data precisely and accurately indicates the position of the workpiece on the automated machine tool. A gauge block can be used during the calibration process. The gauge block has typically been held firmly by hand against a rest pad or other appropriate structure of the automated machine during the calibration process. However, the sensor data display device can be spaced away from the location for the gauge block such that a display of the sensor data can be partially or fully obstructed from view by a worker while firmly holding the gauge on the automated machine tool. Thus, it is possible that the calibration process will be performed by at least two workers—a first worker to firmly hold the gauge block and adjust the sensor and a second worker to read the sensor data display device and report back to the first worker how to adjust the sensor and when the calibration is complete. Depending on the distance between the gauge block and the sensor, it is possible for calibration process to involve a third worker to perform the sensor adjustment. This manpower allotment can increase the cost and time needed to manufacture the final component from the workpiece.

Further, it is possible to separately machine more than one different workpiece on the same automated machine at different times in order to obtain a plurality of different articles of manufacture. Each different article of manufacture can have a different tolerance specification. Thus, the sensor(s) of the automated machine tool can be subjected to a respective calibration process for each different article of manufacture. Typically, a respective gauge block can be created for each tolerance specification that is to be met by the automated machine tool. Thus, a plurality of separate and unique gauge blocks can be created for the automated machine tool.

Figure 1:
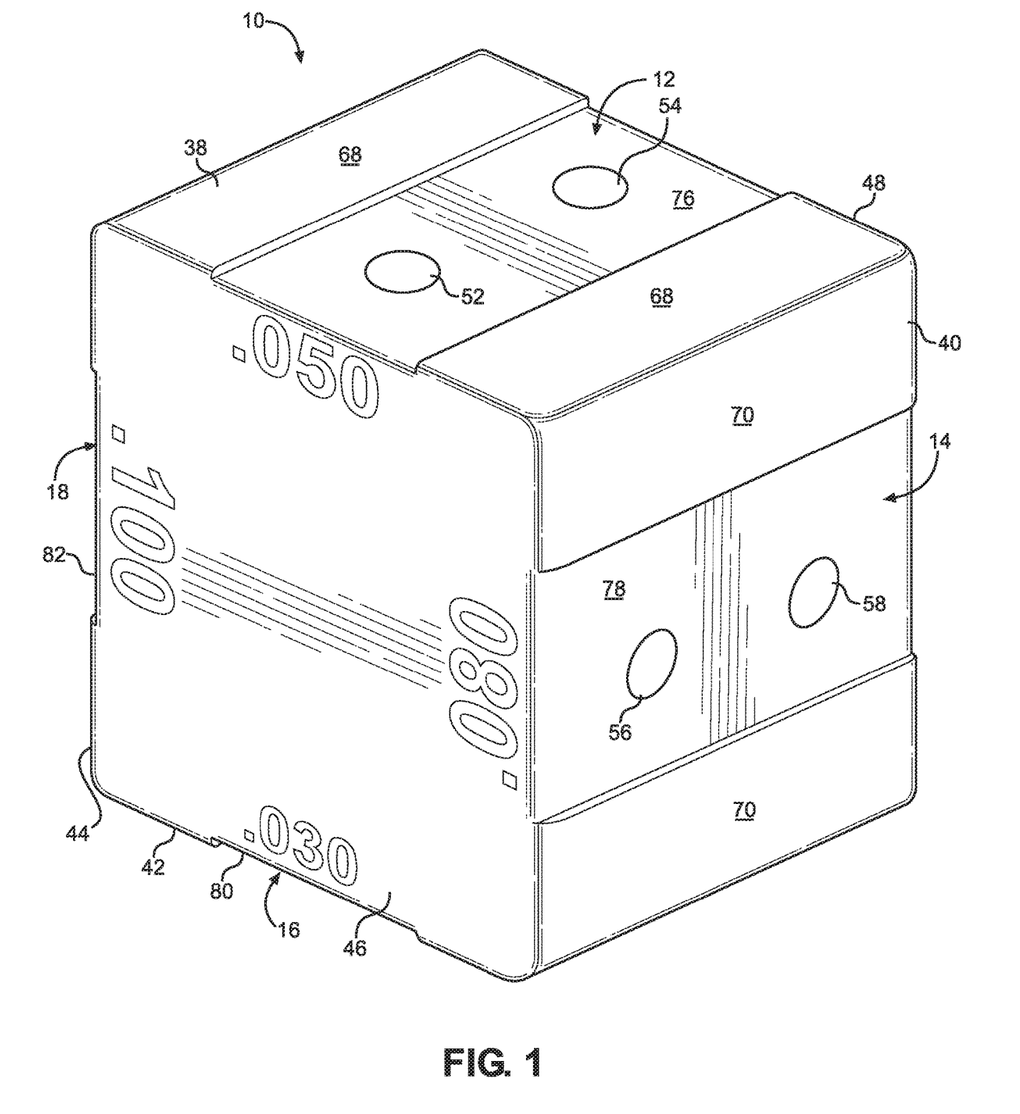
FIG. 1 is a perspective view of a gauge block made in accordance with the principles of the disclosed subject matter.

FIG. 1 illustrates an embodiment of a gauge block 10 made in accordance with principles of the disclosed subject matter. The gauge block 10 can be magnetized such that the gauge block 10 will maintain tight contact with the desired surface of the automated machine tool without a worker manually holding the gauge block 10 during the calibration process. Thus, a same worker can place the gauge block 10 and then move away from the gauge block 10 to read the sensor display device and then return or otherwise adjust the sensor for calibration. The calibration process can be performed by one worker instead of two or more workers. Further, the gauge block 10 can include a plurality of gauge grooves 12, 14, 16, 18. Each of the gauge grooves 12, 14, 16, 18 can have a unique gauge depth, for example, as indicated by exemplary numerical values of "0.050," "0.080," "0.030," and "0.100." The gauge depth of each of the gauge grooves 12, 14, 16, 18 can correspond to a predetermined calibration value desired for the sensor 18 that is being calibrated. Thus, the same gauge block 10 can be used to provide a plurality of different calibration settings for each sensor of the automated machine tool. The gauge depth of each of the grooves 12, 14, 16, 18 is not drawn to scale in FIG. 1 so that the grooves 12, 14, 16, 18 may be readily apparent in the drawing.

Figure 2:
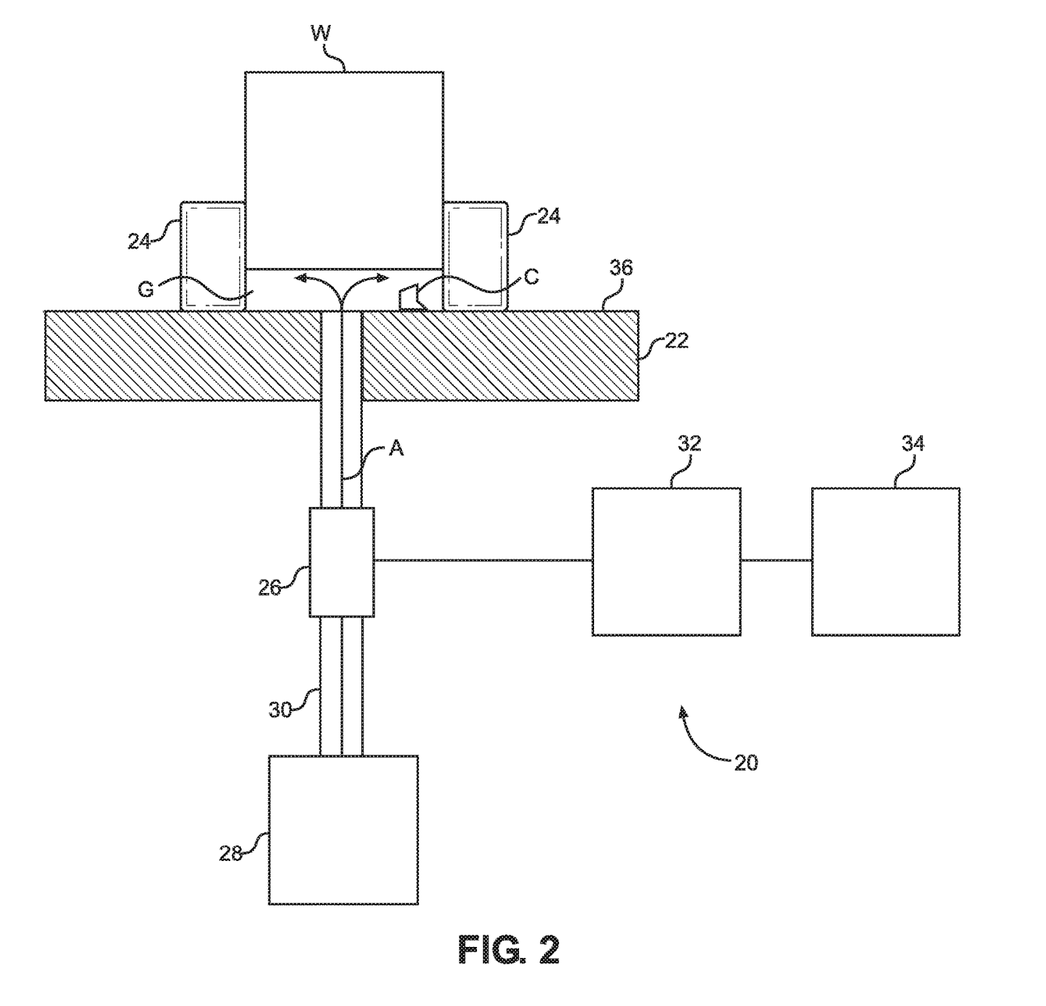
FIG. 2 is a schematic illustration of a portion of an exemplary automated machine tool and a workpiece secured to the automated machine tool.

FIG. 2 schematically illustrates a portion of an automated machine tool 20 that can include a rest pad 22, a clamp assembly 24, a sensor 26, a pressurized air source 28, an air conduit 30, a controller 32 and a display 34. The cutting tool(s) and other portions of the machine tool 20 are omitted from FIG. 2 for clarity and simplicity of the drawing.

A workpiece W can be fixed to the rest pad 22 by the clamp assembly 24 such that the workpiece is spaced away from the surface 36 of the rest pad 22 by a predetermined gap G. The gap G can be predetermined to accommodate a material chip C that has been removed from the workpiece W by the machine tool 20. The gap G also can accommodate other debris or lubricating fluid that is sprayed onto the cutting tool(s) and the workpiece W during the machining operation. The air conduit 30 can supply pressurized air from the pressurized air source 28 to the gap G between the workpiece W and a surface 36 of the rest pad 22.

The sensor 26 can be in fluid communication with the conduit 30 and configured to output data that is indicative of a measured value of the gap G. The sensor 26 can be in electrical communication with the controller 32 and the controller 32 can be in electrical communication with the display 34 such that the controller 32 can present the measured value data obtained by the sensor 26 in a format that can be readily understood by a worker during the operation of the machine tool 20 and during the calibration process for the sensor 26. Thus, the worker can readily ascertain whether the workpiece W is properly positioned in the clamp assembly 24.

Figure 3:
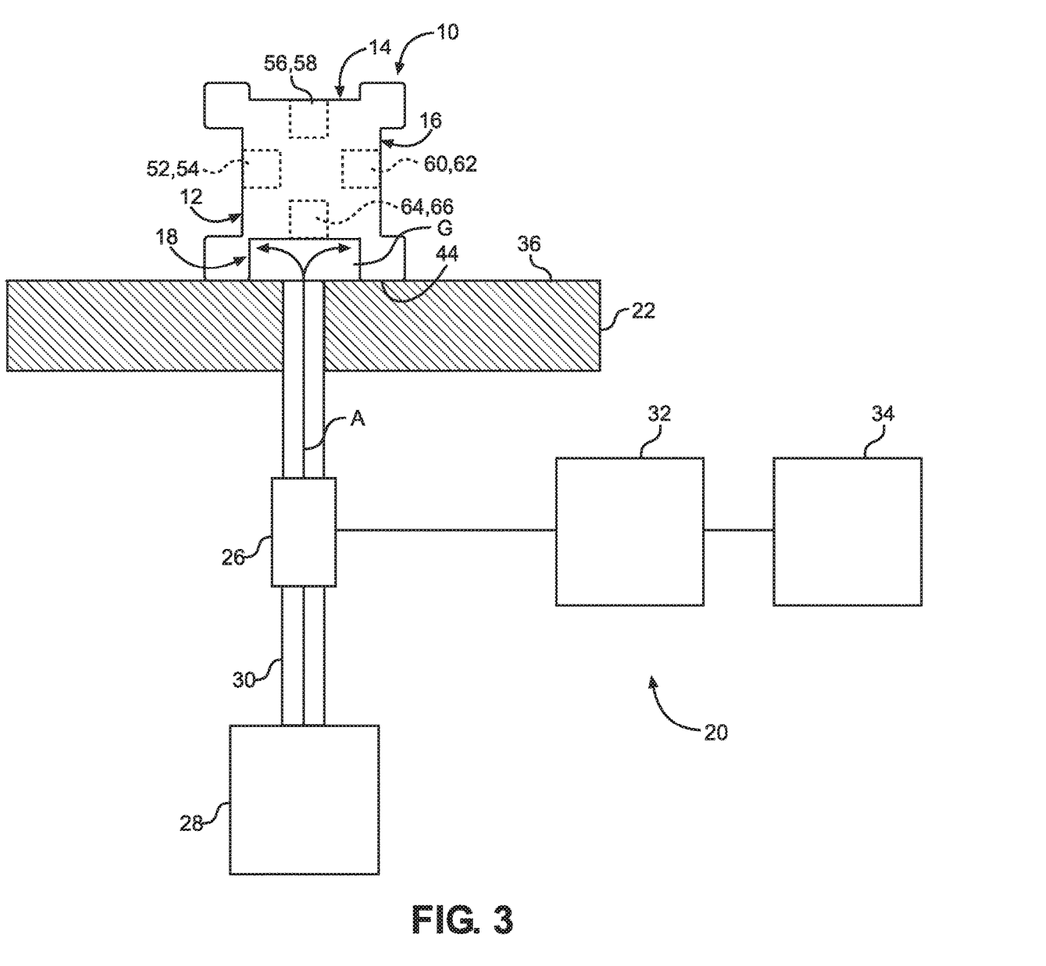
FIG. 3 is schematic illustration of the portion of the automated machine tool of FIG. 2 and the gauge block of FIG. 1.

FIG. 3 is a schematic illustration of the machine tool 20 of FIG. 2 with the clamp assembly 24 omitted for clarity and simplicity of the drawing. FIG. 3 illustrates the gauge block 10 attached to the rest pad 22 at a location that overlaps the air conduit 30. The depth of each of the gauge grooves 12, 14, 16, 18 is not drawn to scale and is exaggerated in FIG. 3 to more easily discern the difference in depths of the gauge grooves 12, 14, 16, 18. FIG. 3 also schematically illustrates permanent magnets 52, 54, 56, 58, 60, 62, 64, 66 that are not drawn to scale with respect to the remainder of the gauge block 10. Further details of the permanent magnets 52, 54, 56, 58, 60, 62, 64, 66 are described below.

It is possible that the gauge block 10 can be incompatible with the clamp assembly 24 due to the size and/or shape of either the clamp assembly 24 or the gauge block 10. Thus, the clamp assembly 24 can be unavailable to tightly hold the gauge block 10 against the surface 36 of the rest pad 22. The gauge block 10 can be magnetized and emit a magnetic field that is sufficient to tightly hold the gauge block 10 to the rest pad 22. Thus, it can be unnecessary for a worker to tightly hold the gauge block 10 against the surface 36 of the rest pad 22 during the calibration process. Further, the magnetized gauge block 10 can provide the flexibility for the gauge block 10 to be used to calibrate the sensor 26 of any machine tool 20 regardless of the configuration of the clamp assembly 24. Thus, the gauge block 10 can be a universal gauge block.

Referring to FIG. 1, the gauge block 10 can include a plurality of sides 38, 40, 42, 44, 46, 48. The sides 38, 40, 42, 44, 46, 48 can be arranged to form a cube or a rectangular parallelepiped. Each of gauge grooves 12, 14, 16, 18 can be recessed into a respective one of the first to fourth sides 38, 40, 42, 44. Each of the fifth side 46 and the sixth side 48 can be devoid of a groove.

The gauge depths of each of the gauge grooves 12, 14, 16, 18 can be difficult to distinguish with the naked eye. Thus, the gauge block 10 can include indicia such as but not limited to the numerical values "0.050," "0.080," "0.030," and "0.100," or color coded markings, or etched markings, that can facilitate the workers selection of the appropriate gauge groove for the calibration process. Since the indicia can alter the smoothness of the planar surface of the fifth and sixth sides 46, 48, these sides do not include a groove and are instead used for communication using the indicia provided on the fifth side 46 and/or the sixth side 48. Sides 46, 48 can be used for handling and storage of the gauge block such that the gauge grooves are not contaminated or otherwise damaged or made inaccurate due to contacts with these surfaces. Thus, the calibration process can be safeguarded and errors can be minimized while the longevity of the gauge bock 10 can be increased.

Before starting the calibration process, the worker can select an appropriate one of the plurality of gauge grooves 12, 14, 16, 18 that corresponds to the desired calibration value for the sensor 26. After the appropriate one of the gauge grooves 12, 14, 16, 18 has been selected, the worker can orient the gauge block 10 relative to the surface 36 of the rest pad 22 such that respective one of the sides 38, 40, 42, 44 abuts the surface 36 of the rest pad 22 and the selected one of the gauge grooves 12, 14, 16, 18 opposes the air conduit 22. FIG. 3 shows an exemplary calibration process in which the fourth gauge groove 18 is selected and the fourth side 44 of the gauge block 10 has been magnetically attached to the surface 36 of the rest pad 22. After attaching the gauge block 10 to the rest pad 14, the worker can then proceed with the calibration process for the sensor 26.

Specifically, the worker can cause the pressurized air supply 28 to supply air to the air conduit 30. The air conduit 22 can be configured to direct air exiting the air conduit in one or more directions such that the air exiting the air conduit 30 strikes the gauge block 10 before exiting the gap G or striking the surface 36 of the rest pad 22. Exemplary embodiments can include a conduit 30 that includes a nozzle at the end adjacent to the rest pad 22 and the gauge block 10 that can be configured to control the direction of the air exiting the nozzle in a predetermined manner.

The sensor 26 can be configured to output data that is indicative of a measured value of the gap G. The sensor 26 can be referred to as a gap sensor, a gap switch, or an air gap sensor and the gauge block 10 can be referred to as a gap switch block. For example, the sensor 26 can be configured to sense the air pressure or an air flow rate (mass flow rate or volumetric flow rate). The sensor 26 and/or the controller 32 can be configured with hardware alone or in combination with software to determine a measured value of the gap G based on the sensor data. The measured value of the gap G can be measured perpendicular to the surface 36 of the rest pad 22.

The controller 32 can be configured to cause the display 34 to present the measured value of the gap G in a manner that can be readily understood by the worker. The worker can adjust the sensor 26, as needed, until the measured value of the gap G is equal to the gauge depth of the selected one of the gauge grooves 12, 14, 16, 18. Once the calibration process is completed, the worker can remove the gauge block 10 and a workpiece W can be clamped to the rest pad 22 by the clamp assembly 24, and the machine tool 20 can then be operated to machine the workpiece into the desired article of manufacture.

Accordingly, the magnetic gauge block 10 can allow a single worker to perform the calibration process in a reliable and cost/time efficient manner.

The magnitude of the magnetic field emitted by the gauge block 10 can be predetermined such that the force of attraction between the gauge block 10 and the rest pad 22 is greater than the force applied by the air stream A to the gauge block 10. The magnetic attractive force can be a predetermined magnitude such that the gauge block 10 is in contact with only the surface 36 of the rest pad 22 and with no other structure such that the only force keeping the gauge block 10 secured to the machine tool 20 is the magnetic force between the gauge block 10 and the surface 36 of the rest pad 22 (and any friction force resulting from contact between the surface of the gauge block 10 and the surface 36 of the rest pad 22).

The gauge block 10 can be formed from a permanent magnet stock that is precision machined into a cube or a rectangular parallelepiped. It is possible that the magnitude of the magnetic field for the gauge block 10 formed from a permanent magnet stock can apply an attractive force that is sufficient to attract foreign objects such as but not limited to the material chips C shown in FIG. 2. If the material chip C becomes magnetically attached to either the gauge block 10 in the selected one of the gauge grooves 12, 14, 16, 18 or to the side 38, 40, 42 or 44 that is intended to abut the surface 36 of the rest pad 22, then the calibration process might result in an ineffectual calibration of the sensor 26.

Figure 4:
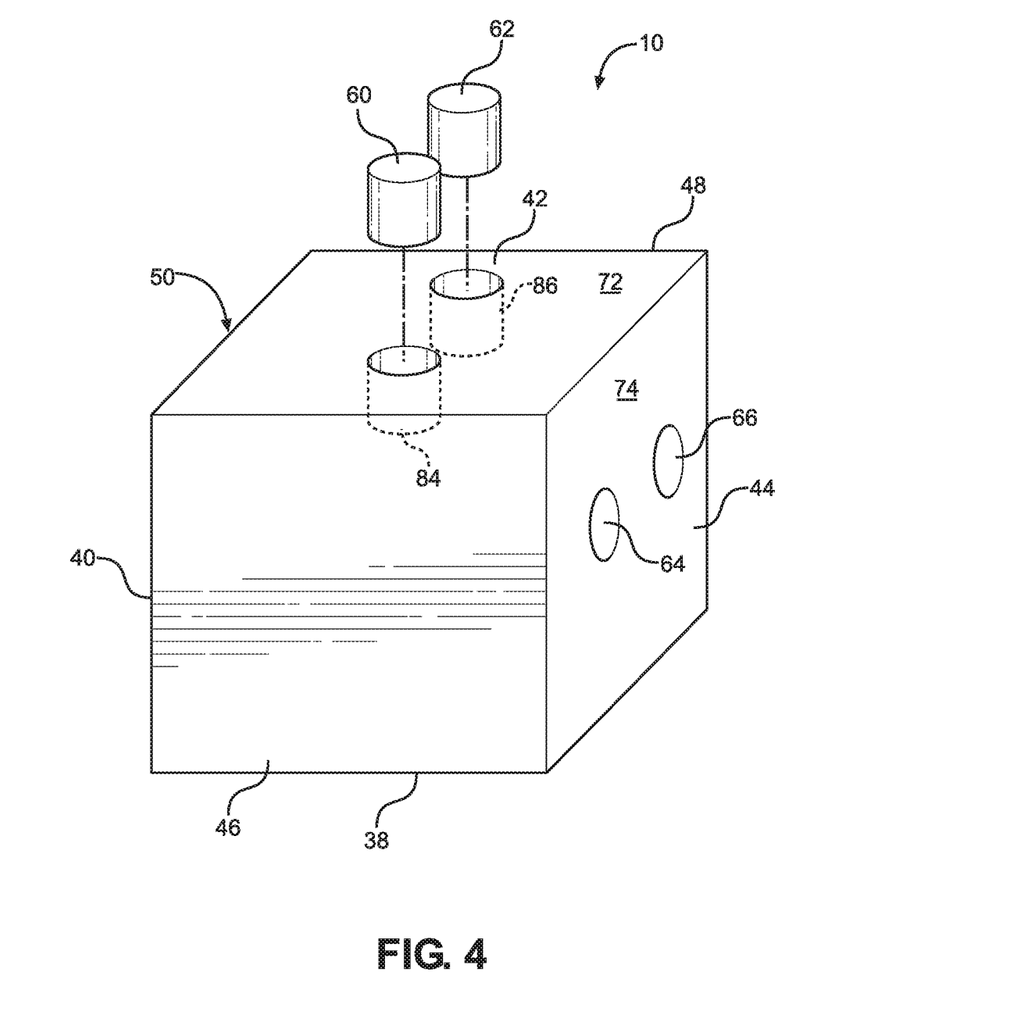
FIG. 4 is an exploded perspective view of an interim state during assembly of the gauge block of FIG. 1.

Instead of forming the entire gauge block 10 from a permanent magnet stock, the gauge block 10 can include a block body 50 and a plurality of permanent magnets 52, 54, 56, 58, 60, 62, 64, 66 that are fixed to the block body 50, as shown in FIGS. 1, 3 and 4. The block body 50 can be made from a non-magnetic material. The permanent magnets 52, 54, 56, 58, 60, 62, 64, 66 can have a predetermined magnitude for the magnetic field such that each of the permanent magnets 52, 54, 56, 58, 60, 62, 64, 66 can tightly hold the gauge block 10 on the surface 36 of the rest pad 22. Further, the predetermined magnitude of each of the permanent magnets 52, 54, 56, 58, 60, 62, 64, 66 can be set at a value that does not easily attract foreign objects such as but not limited to a material chip C shown in FIG. 2.

Referring to FIGS. 1 and 4, the permanent magnets 52, 54, 56, 58, 60, 62, 64, 66 can have a cylindrical shape. The permanent magnets 52, 54, 56, 58, 60, 62, 64, 66 can be sized such that the height and diameter have the same numerical value. However, the permanent magnets 52, 54, 56, 58, 60, 62, 64, 66 can have any appropriate shape and size such that the permanent magnets 52, 54, 56, 58, 60, 62, 64, 66 reliably secure the gauge block 10 to the surface 36 of the rest pad 22 and do not attract a detrimental amount or size of material chips C.

FIG. 4 shows an interim assembled state of the gauge block 10 during which the permanent magnets 52, 54, 56, 58, 60, 62, 64, 66 can be attached to the block body 50 before the gauge grooves 12, 14, 16, 18 have been formed. The block body 50 can include the plurality of sides 38, 40, 42, 44, 46, 48 and a plurality of blind bores. FIG. 4 shows only the first and second blind bores 84, 86 in the third side 42 for clarity and simplicity of the drawing. Each of the remaining sides 38, 40, 44, 46, 48 can include a respective pair of blind bores similar to or the same as the first and second blind bores 84, 86.

The permanent magnets 52, 54, 56, 58, 60, 62, 64, 66 can be fixed in a respective one of the blind bores such that the permanent magnets 52, 54, 56, 58, 60, 62, 64, 66 are not accidentally dislodged from the base during the calibration process. One exemplary embodiment of the gauge block 10 can include the permanent magnets 52, 54, 56, 58, 60, 62, 64, 66 fixed into the respective one of the blind bores by an adhesive.

Referring to FIGS. 1 and 4, each of the gauge grooves 12, 14, 16, 18 can be formed in the respective one of the first side 38, the second side 40, the third side 42 and the fourth side 44 after the permanent magnets 52, 54, 56, 58, 60, 62, 64, 66 have been secured to the block body 50. As a result, the exposed surface of each of the permanent magnets 52, 54, 56, 58, 60, 62, 64, 66 can be flush or co-planar with the bottom surface of a respective one of the gauge grooves 12, 14, 16, 18. For example, each of the gauge grooves 12, 14, 16, 18 can be precision machined into the respective one of the sides 38, 40, 42, 44 after the respective pair of magnets 52, 54, 56, 58, 60, 62, 64, 66 have been secured to the block body 50.

Referring to FIGS. 1 and 4 collectively, the gauge block 10 can include a plurality of contact surfaces 68, 70, 72, 74. A respective one of the contact surfaces 68, 70, 72, 74 can tightly contact the surface 36 of the rest pad 22 depending on which of the gauge grooves 12, 14, 16, 18 is selected by the worker for the calibration process.

Each of the first, second, third and fourth sides 38, 40, 42, 44 can include a respective one of the contact surfaces 68, 70, 72, 74.

Each of the gauge grooves 12, 14, 16, 18 can extend across the respective one of the first, second, third and fourth sides 38, 40, 42, 44 from the fifth side 46 to the sixth side 48. Each of the gauge grooves 12, 14, 16, 18 can have a rectangular surface that extends from the fifth side 46 to the sixth side 48.

Figure 5:
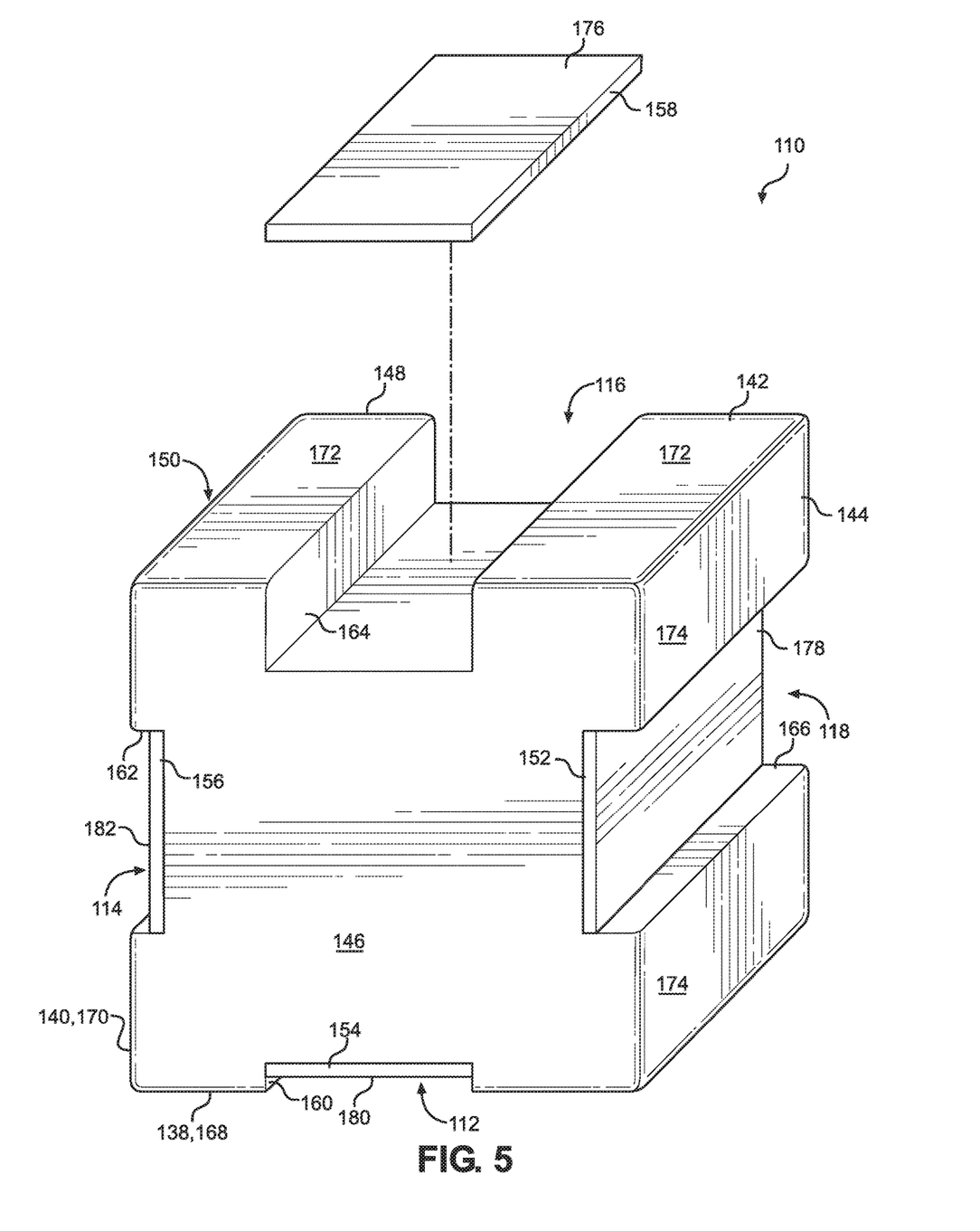
FIG. 5 is a perspective partially exploded view of another exemplary embodiment of a gauge block made in accordance with principles of the disclosed subject matter.

FIG. 5 shows an alternate embodiment of a gauge block 110 made in accordance with the principles of the disclosed subject matter. The gauge block 110 can include a block body 150 and a plurality of permanent magnets 152, 154, 156, 158 that are fixed to the block body 150. The block body 150 can be made from a non-magnetic material. The permanent magnets 152, 154, 156, 158 can have a predetermined magnitude for the magnetic field such that each of the permanent magnets 152, 154, 156, 158 can tightly hold the gauge block 110 on the surface 36 of the rest pad 22. Further, the predetermined magnitude of each of the permanent magnets 152, 154, 156, 158 can be set at a value that does not easily attract foreign objects such as but not limited to a material chip C shown in FIG. 2.

The block body 150 can include the plurality of sides 138, 140, 142, 144, 146, 148 and a plurality of block grooves 160, 162, 164, 166. Each of the block grooves 160, 162, 164, 166 can be recessed into a respective one of the sides 138, 140, 142, 144. The depth of each of the block grooves 160, 162, 164, 166 can be set at a value such that the outer surface of the respective one of the permanent magnets 152, 154, 156, 158 is recessed from the respective one of the sides 138, 140, 142, 144 by the respective gauge depth. That is, the depth of each of the block grooves 160, 162, 164, 166 can be equal to the respective gauge depth plus the thickness of the respective one of the permanent magnets 152, 154, 156, 158. The depth of the block grooves 160, 162, 164, 166 is not drawn to scale and is exaggerated in FIG. 5 to more easily discern the different depths.

The permanent magnets 152, 154, 156, 158 can be fixed to the base of the respective one of the block grooves 160, 162, 164, 166 such that the permanent magnets 152, 154, 156, 158 are not accidentally dislodged from the base during the calibration process. One exemplary embodiment of the gauge block 110 can include the permanent magnets 152, 154, 156, 158 fixed to the base of the respective one of the block grooves 160, 162, 164, 166 by an adhesive.

The gauge block 110 can include a plurality of contact surfaces and a plurality of gauge surfaces 176, 178, 180, 182. The third and fourth contact surfaces 172, 174 are visible in FIG. 5 and the first and second contact surface 168, 170 are obstructed from view in FIG. 5. However, the first and second contact surfaces 168, 170 can be configured in a similar or identical manner to the first and second contact surfaces 68, 70 of FIG. 1. A respective one of the contact surfaces 168, 170, 172, 174 can tightly contact the surface 36 of the rest pad 22 depending on which of the gauge grooves 112, 114, 116, 118 is selected by the worker for the calibration process. A respective one of the gauge surfaces 176, 178, 180, 182 can be spaced away from the surface 36 of the rest pad 22 by the respective one of the unique gauge depths when the gauge block 110 is magnetically attached to the surface 36 of the rest pad 22.

Each of the first, second, third and fourth sides 138, 140, 142, 144 can include a respective one of the contact surfaces 168, 170, 172, 174 and a respective one of the gauge surfaces 176, 178, 180, 182. Each of the gauge surfaces 176, 178, 180, 182 can be recessed from the respective one of the contact surfaces 168, 170, 172, 174 by a unique gauge depth. The gauge surfaces 176, 178, 180, 182 can be formed on the block body 150 if the block body is magnetized. In FIG. 5, each of the gauge surfaces 176, 178, 180, 182 can be formed on a respective one of the permanent magnets 152, 154, 156, 158. Each of the contact surfaces 168, 170, 172, 174 and the gauge surfaces 176, 178, 180, 182 can be precision machined into a smooth planar surface.

Each of the gauge grooves 112, 114, 116, 118 can extend across the respective one of the first, second, third and fourth sides 138, 140, 142, 144 from the fifth side 146 to the sixth side 148. Each of the gauge grooves 112, 114, 116, 118 can have a rectangular surface that extends from the fifth side 146 to the sixth side 148.

Electrical communication lines (not numbered) can connect the controller 32 to the display 34 and the sensor 26 in any appropriate manner. Electrical communication can be either one-way communication or two-way communication and can be networked or not networked. The controller 32 also can be referred to as an electronic control unit (ECU) or as a central processing unit. The sensor 26 can be configured with hardware, with or without software, to perform the assigned task(s). The sensor 26 can be configured as a smart sensor such that the sensor 26 can process the raw data collected by the sensor 26 prior to transmission to the controller 32, or the sensor 26 can be configured as a simple sensor that passes the raw data directly to the controller 32 without any manipulation of the raw data. The sensor 26 can be configured to send data to the controller 32, with or without a prompt from the controller 26.

While certain embodiments of the invention are described above, it should be understood that the invention can be embodied and configured in many different ways without departing from the spirit and scope of the invention.

For example, embodiments are disclosed above in the context of a cube shown in FIGS. 1, 4 and 5. However, embodiments are intended to include or otherwise cover any type of shape for the gauge block 10. For example, the gauge block can be a cylinder with a recess gauge surface formed in each flat circular end wall of the cylinder. In another alternate embodiment, the gauge block can be a polygonal block having any appropriate number of sides that can provide a desired number of gauge grooves so long as the gauge block is stably and tightly attached to the rest pad 22 by the magnetic field of the gauge block. In another exemplary embodiment, the gauge block can be a rectangular parallelepiped having dimensions of, for example, 10 mm×13 mm×50 mm and a pair of gauge grooves formed on opposed sides such as the 13 mm×50 mm opposed sides of the parallelepiped.

Exemplary embodiments of the gauge block can also include a gauge recess formed on each of the fifth side 46 and the sixth side 48. In this exemplary embodiment, the indicia can be omitted.

Exemplary embodiments are also intended to cover any shape and size for the gauge grooves. For example, the gauge grooves 12, 14, 16, 18 can terminate on the respective one of the sides 38, 40, 42, 44 at a location that is spaced away from the fifth side 46 and/or the sixth side 48. Exemplary embodiments can include the gauge grooves formed as a blind bore machined into each of the sides 38, 40, 42, 44 so long as the diameter of the blind bore is of sufficient size that the worker can reliably align the blind bore with the outlet of the air conduit 30.

FIG. 5 shows the permanent magnets 152, 154, 156, 158 completely covering the base of the respective one of block grooves 160, 162, 164, 166. However, exemplary embodiments can include the permanent magnets 152, 154, 156, 158 being smaller than the respective one of the block grooves 160, 162, 164, 166 so long as the surface of the permanent magnets 152, 154, 156, 158 can provide enough magnetic force while also providing a reliable, accurate and precise calibration surface for the sensor 26.

Exemplary embodiments are disclosed above in the context of the sensor 26 that measures the gap G using a pressurized air supply. However, exemplary embodiments of the gauge block can be used to calibrate a laser-based sensor as the sensing apparatus. The gauge block can be used to set and confirm the proper calibration of the laser-based sensor. The laser-based sensor can be advantageous for measuring air gaps that greater than 1 mm.

What is claimed is:

1. An apparatus for calibrating a gap sensor of a machine tool, comprising:
 a gauge block having a plurality of gauge grooves, each of the gauge grooves has a unique gauge depth that corresponds to a respective one of a plurality of predetermined calibration values for the gap sensor; and
 a plurality of magnets, each of the magnets is embedded in the gauge block, wherein
 the gauge block includes a plurality of sides,
 each of the gauge grooves is recessed into a respective one of the sides, and
 each of the magnets is mounted in a respective one of the gauge grooves.

2. The apparatus according to claim 1, wherein each of the magnets is glued in the gauge block.

3. The apparatus according to claim 1, wherein
 each of the sides has a contact surface,
 each of the magnets has a gauge surface that is spaced below a respective one of the contact surfaces by a respective one of the gauge depths.

4. The apparatus according to claim 1, wherein
 the gauge block includes the sides arranged into a cube, and
 each of magnets is embedded in a respective one of four of the sides.

5. The apparatus according to claim 4, wherein each of a pair of the sides is devoid of one of the magnets, and the pair of sides are opposite sides of the cube.

6. The apparatus according to claim 5, wherein one of the pair of sides that is devoid of one of the magnets includes indicia that uniquely identify each of the gauge grooves.

7. The apparatus according to claim 4, wherein each of the sides that has an embedded magnet abuts a respective pair of the sides that have an embedded magnet.

8. The apparatus according to claim 1, wherein
 the gauge block includes a first side, a second side, and a third side,
 the first side extends from and is connected to each of the second side and the third side, and
 a first groove of the plurality of gauge grooves extends along the first side from the second side to the third side.

9. The apparatus according to claim 8, wherein
 the gauge block includes a fourth side, a fifth side and a sixth side,
 each of the fourth side, the fifth side, and the sixth side extends from and is connected to each of the first side and the second side, and
 a first groove of the plurality of gauge grooves extends along the fourth side from the second side to the third side,
 a second groove of the plurality of gauge grooves extends along the fifth side from the second side to the third side, and
 a third groove of the plurality of gauge grooves extends along the sixth side from the second side to the third side.

10. The apparatus according to claim 1, wherein
 each of the gauge grooves includes a rectangular surface and at least one blind bore that is opened at the rectangular surface, and
 each of the magnets is cylindrical and fills a respective one of the blind bores.

11. The apparatus according to claim 1, wherein the gauge block includes,
 a plurality of contact surfaces configured to selectively engage a rest pad of the machine tool, and
 a plurality of gauge surfaces, and each of the gauge surfaces is recessed from a respective one of the contact surfaces by an amount that corresponds to a respective one of the unique gauge depths.

12. The apparatus according to claim 11, wherein at least one of the magnets includes an exposed surface that forms a portion of a respective one of the gauge surfaces.

13. A method of calibrating an air gap sensor for a machine tool, comprising:
 providing a magnetized calibration device that includes a first surface, a first groove recessed from the first surface, a second surface, and a second groove recessed from the second surface, the first groove having a first predetermined gauge depth and the second groove having a second predetermined gauge depth, where the first predetermined gauge depth is different from the second predetermined gauge depth;
 selecting one of the first groove and the second groove that corresponds to a desired calibration value for the air gap sensor;
 attaching the magnetized calibration device to a rest pad of the machine tool using a magnetic attraction of the magnetized calibration device to the rest pad such that the one of the first groove and second groove that is selected faces toward the rest pad and is spaced away from the rest pad by a gap that corresponds to a respective one of the first predetermined gauge depth and second predetermined gauge depth;
 applying air to the rest pad and the one of the first groove and second groove;
 using the air gap sensor to obtain a measured value of the gap; and
 adjusting the air gap sensor when the measured value is not equal to the respective one of the first predetermined gauge depth and second predetermined gauge depth until the measured value is equal to the respective one of the first predetermined gauge depth and second predetermined gauge depth.

14. The method according to claim 13, wherein setting the magnetized calibration block includes contacting the magnetized calibration block with only a surface of the machine tool and with no other structure such that the only force keeping the magnetized calibration block secured to the machine tool is the magnetic force between the magnetized calibration block and the machine tool surface and any friction force resulting from contact between the magnetized calibration block and the surface of the machine tool.

15. The method according to claim 13, wherein
 providing the magnetized calibration device includes providing an embedded magnet in at least the first groove,
 attaching the magnetized calibration device includes opposing the rest pad with the magnet such that the magnet is spaced away from the rest pad by the gap, and using the air gap sensor to obtain a measured value of the gap between the magnet and the rest pad.

16. A method of calibrating a gap sensor for a machine tool, comprising:

providing a magnetized calibration block that includes at least a first planar contact surface and a first planar measuring surface, the first planar contact surface being offset from the first planar measuring surface by a first predetermined distance along a first measuring axis of the calibration device, the first measuring axis being perpendicular to the first planar contact surface and the first planar measuring surface, the calibration device further including at least a second planar contact surface and a second planar measuring surface, the second planar contact surface being offset from the second planar measuring surface by a second predetermined distance along a second measuring axis of the calibration device, the second measuring axis being perpendicular to the second planar contact surface and the second planar measuring surface;

setting the magnetized calibration block onto a surface of the machine tool such that one of the first planar measuring surface and the second planar measuring surface is located at a predetermined location on the surface of the machine tool, and such that at least one of the first planar contact surface and the second planar contact surface is in contact with the surface of the machine tool, and such that the magnetized calibration block is secured to the surface of the machine tool by a magnetic force; and using the gap sensor to obtain a measured distance value of a gap bounded at one side by the one of the first planar measuring surface and the second planar measuring surface.

17. The method according to claim 16, further comprising:

adjusting the gap sensor when the measured distance value is not equal to a predetermined distance value corresponding to the one of the first planar measuring surface and the second planar measuring surface.

18. The method according to claim 16, wherein setting the magnetized calibration block includes contacting the magnetized calibration block with only the surface of the machine tool and with no other structure such that the only force keeping the magnetized calibration block secured to the machine tool is the magnetic force between the magnetized calibration block and the machine tool surface and any friction force resulting from contact between the at least one of the first planar contact surface and the second planar contact surface and the surface of the machine tool.

* * * * *